May 1, 1962     T. A. HERBERT, JR     3,032,150

HEAT INSULATING PANEL AND METHOD OF MAKING SAME

Original Filed Nov. 28, 1955     2 Sheets-Sheet 1

INVENTOR.
T.A. HERBERT JR.

BY George E. Pearson

ATTORNEY

May 1, 1962  T. A. HERBERT, JR  3,032,150
HEAT INSULATING PANEL AND METHOD OF MAKING SAME
Original Filed Nov. 28, 1955  2 Sheets-Sheet 2

INVENTOR.
T.A. HERBERT JR.
BY George E. Pearson
ATTORNEY

3,032,150
HEAT INSULATING PANEL AND METHOD OF MAKING SAME

Thomas A. Herbert, Jr., Chula Vista, Calif., assignor to Rohr Aircraft Corporation, Chula Vista, Calif., a corporation of California
Original application Nov. 28, 1955, Ser. No. 549,321. Divided and this application May 29, 1959, Ser. No. 816,934
8 Claims. (Cl. 189—34)

This invention relates to a heat insulating panel utilizing honeycomb sandwich panel structure and the method of making such a panel. This application is a division of my co-pending application for Heat Insulating Panel and Method of Making Same, Serial No. 549,321, filed November 28, 1955, now Patent No. 2,926,761.

The use of higher temperatures in the duct systems and power plants of airplanes, especially those using jet engines, than those formerly used has developed a demand for heat insulating panels which can be assembled together to form a heat barrier which will confine the heat within the duct or other member through which the current of hot gas is passing. It is a purpose of my invention to provide a heat insulating panel which will conduct away only a small amount of the heat even when the temperature difference between the opposite faces of the panel is over 400° F.

Another object is to provide such a heat insulating panel which will not be damaged when subjected to temperatures of the order of 1,000° to 1,800° F.

A further object is to provide a panel of the type described which is light in weight and thin so that it may be installed in confined spaces in airplanes and other structures where there is insufficient room to accommodate the usual type of thick heat insulator.

Another object is to provide a panel of the type described which is made entirely of fireproof material and therefore is not a fire hazard.

A further object is to provide a panel in which in order for heat to escape, it must first pass through a plurality of thin metal cells interconnected together in the form of a honeycomb and also through a layer of fabric or matting of low thermal conductivity, the cells of the honeycomb being arranged to lend great strength and stiffness to the assembly.

Further objects will become apparent as a description of different types of panels proceeds. For a better understanding of the invention, reference is made to the accompanying drawings, in which.

Figure 1:
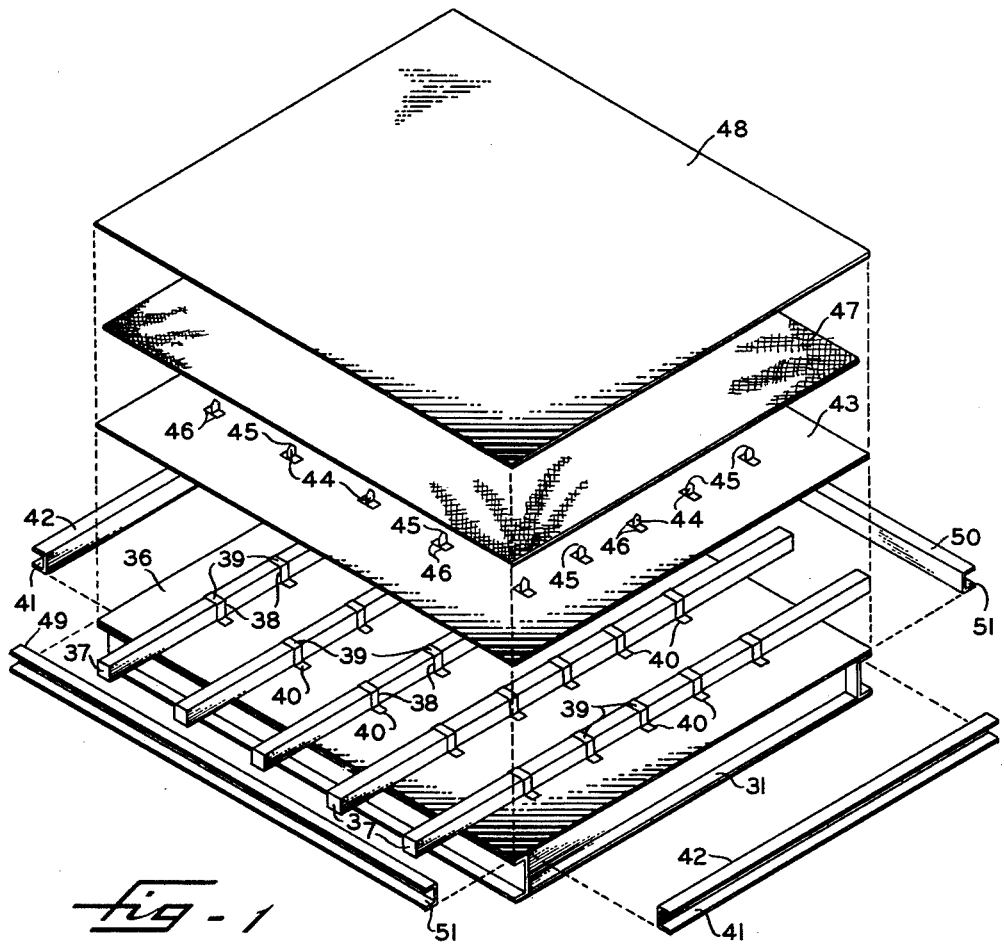
FIG. 1 is an exploded perspective view showing the parts of a form of insulating panel embodying the invention.
Figure 3:
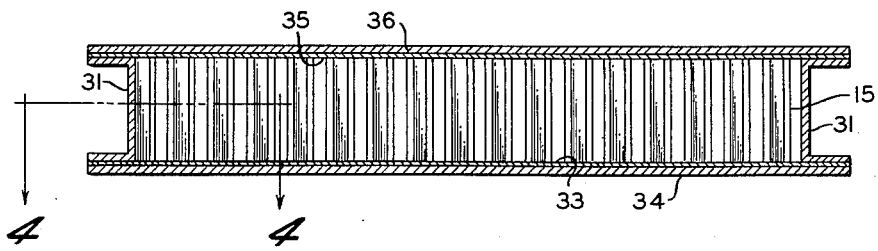
FIG. 3 is a sectional view showing the component parts of a metal honeycomb panel assembled for brazing together.

In making the heat-insulating panel shown in FIG. 1, channels 31 are abutted against the sides of stainless steel honeycomb core 15 (see FIGS. 3 and 4) and channels 32 against the front and rear ends. The assembly is placed on a strip 33 of brazing alloy under which is a sheet 34 of stainless steel. The top of core 15 and the channels is then covered with a strip 35 of brazing alloy and a thin plate or sheet 36 of stainless steel. Tack welds may be made at spaced apart points along the edges of sheets 34 and 36 and the flanges of the channels to hold the parts together previous to brazing.

Figure 5:
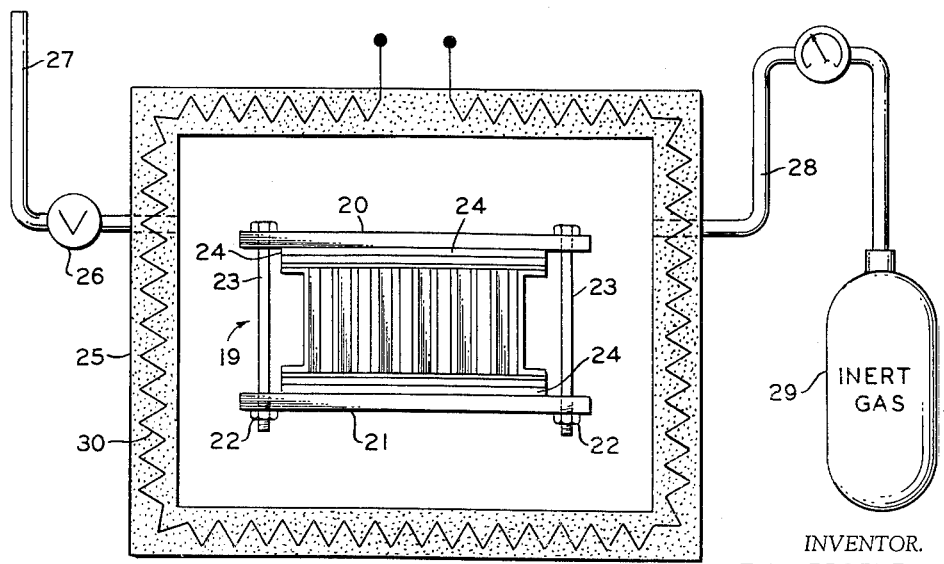
FIG. 5 is a view, partly diagrammatic, showing the panel of FIG. 3 in a furnace ready for brazing.

The assembly is then put in a press 19 which may be of the type shown in FIG. 5, the press comprising upper and lower rigid metal plates 20—21 which may be drawn together by tightening the nuts 22 of bolts 23. Thin stainless steel peel skins 24 having a thickness of about .001 inch are preferably interposed between the panel and plates 20 and 21. The press and contained panel are placed in a furnace 25 from which the air is purged by opening a valve 26 in outlet pipe 27 and connecting inlet pipe 28 to a tank 29 of a suitable inert gas under pressure. This gas is preferably dry argon or hydrogen or a mixture of both. When the air is all out of the furnace, the furnace is heated by passing electrical current through heating resistor 30 disposed in the floor and walls of the furnace. The panel is heated to a temperature of 1800° F. for a few minutes then the current shut off. The brazed panel is left to cool in the inert atmosphere so that no oxidation of its parts takes place which would weaken it substantially.

Figure 2:
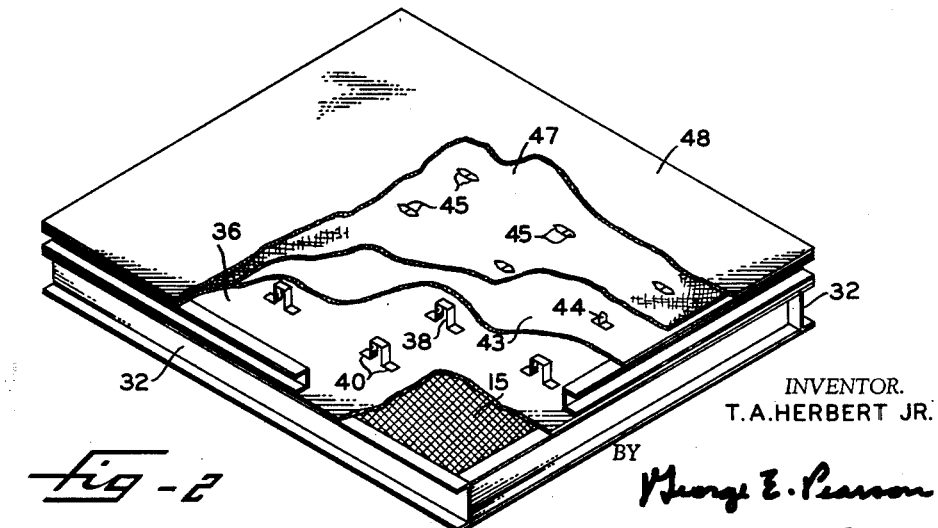
FIG. 2 is a perspective view of the panel of FIG. 1 after assembly with certain parts broken away to show the interior construction.
Figure 4:
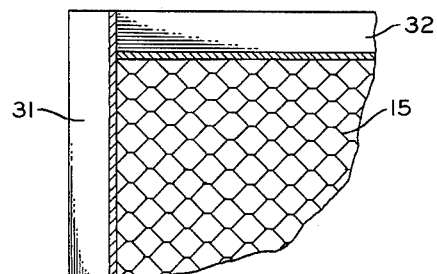
FIG. 4 is a sectional view on line 4—4 of FIG. 3 showing one corner portion of the panel.

Referring to FIGS. 1 and 2, a plurality of copper bars 37 are laid on plate 36 and spaced 2 inches apart. Straddling each bar is a plurality of stainless steel spacers 38, each spacer having a flat top 39 and a base consisting of a pair of projecting flanges 40. The spacers are spaced 2 inches apart and their flanges 40 spot welded to plate 36. The bottom flanges 41 of a pair of channels 42 are resistance welded to the top of plate 36 along the sides thereof by a suitable electric welding machine, not shown. A thin sheet 43 of stainless steel is then laid on top of spacers 38 and a plurality of clips 44 are then laid on sheet 43 over the spacers. Each clip is composed of two leaves having pointed upper ends 45 and outwardly projecting bases 46. By connecting one end of the welding transformer secondary (not shown) to the end of a bar 37 and its other end to a spot welding electrode (not shown) and pressing the welding electrode down on the bases 46 of the clips successively, the clips are welded to sheet 43 and the sheet 43 welded to the tops 39 of the spacers 38 in contact with that bar 37. The transformer secondary is now connected to the next bar 37 and the clips 44 above this bar spot welded to sheet 43 and this sheet to the spacers 38. This process is continued until all the clips have been secured to sheet 43. The use of a heavy metal bar against which thin metal parts to be spot welded together are pressed by a welding electrode is shown in FIG. 4 of U.S. Patent No. 2,599,045.

A pad 47 of soft heat insulating material is now pressed down against the clips 44 until their pointed ends 45 penetrate the pad and the pad rests on sheet 43. The size of pad 47 is somewhat less than that of sheet 43, so that the edges of sheet 43 extend out slightly beyond those of the pad, as shown. The pad illustrated is made of a piece of quartz glass woven fabric but it may be made of a thin layer of such fabric covered by a thicker layer of quartz glass fibers lightly pressed together to form a light, porous matting. Or the entire pad could be a light matting of quartz glass fibers or asbestos fibers. The ends 45 of the clips are next spread apart and bent down against the pad, as shown in FIG. 2, thus securing the pad to sheet 43. A thin stainless steel sheet 48 the same size as sheet 43 is now placed on top of the pad and spot welded to the bent over ends of clips 44 by pressing a welding electrode down against the top of sheet 48 directly above the clips. During this welding the copper bars 37 act as supports and also carry the welding current, as above described.

The bars 37 are now withdrawn by sliding them endwise through spacers 38 and a pair of end channels 49, 50 secured to the top of sheet 36 by resistance welding their outwardly projecting lower flanges 51 to the sheet.

The channels 42, 49 and 50 are high enough that their upper flanges touch the bottom face of sheet 43 along the edges thereof thus providing a dead air space between the top plate 36 of the honeycomb panel and the metal envelope containing the quartz glass insulation. By making the honeycomb panel of the materials described and sheets 43 and 48 of stainless steel from .001 to .003 inch thick, a heat insulating panel is secured which will conduct away only a little heat when its top face is exposed to a temperature of about 1,000° F. Furthermore the panel is strong yet so light in weight that it may be used around ducts and other parts of airplanes subjected to high temperatures without appreciably increasing the weight of the plane.

If an additional layer of insulation is required, another set of clips (not shown) may be attached to the top of sheet 48 and a second insulating pad similar to pad 47 secured to the top of sheet 48 by bending down the tops of such clips in the manner above described.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A heat insulating panel comprising, two thin metal sheets; a pad disposed between and in contact with said sheets, said pad being composed of material having low thermal conductivity; means securing said sheets together comprising a plurality of spaced clips extended through said pad and welded at opposite ends to said sheets respectively; and a metal core composed of a plurality of interconnected honeycomb cells, one end of each of the cells of said core being securely connected to the exposed face of one of said metal sheets.

2. A panel as claimed in claim 1, in which said pad consists of one or more pieces of fiber glass fabric.

3. A panel as claimed in claim 1, in which the cells of said core are connected to the face of said one sheet by means including a thin film of metal brazing alloy.

4. A panel as claimed in claim 1, in which a thin metal sheet is attached to and covers the end of said core opposite that to which said one metal sheet is connected.

5. A heat insulating structure comprising, a metal core composed of a plurality of interconnected cells; a thin metal plate attached to the upper end of each of said cells; a plurality of discrete spaced apart spacers attached to the upper face of said metal plate; a thin metal sheet attached to the upper ends of said spacers; a pad attached to said metal sheet and covering the major portion of the top face thereof, said pad being composed of fireproof material having low thermal conductivity; a plurality of spaced apart clips having their lower ends attached to said metal sheet, said clips having portions protruding up through said pad; and a second thin metal sheet attached to the protruding portions of said clips and covering the top surface of said pad.

6. A heat insulating panel comprising, two thin metal sheets; a pad disposed between and in contact with said sheets, said pad being composed of incombustible material of low thermal conductivity; means securing said sheets together comprising clips protruding through said pads and welded to said sheets; a metal core composed of a plurality of interconnected honeycomb cells; a thin metal plate attached to and covering one end of said core; and means connecting one of said sheets to the other end of said core.

7. A heat insulating panel comprising, a metal core composed of a plurality of interconnected cells having vertical walls subdividing the core into a plurality of compartments; a metal plate attached to and covering one end of said core; a perforate pad having one face extending across the face of said plate, said pad being composed of compressible noncombustible heat insulating material of low thermal conductivity; a thin metal sheet substantially covering the other face of said pad; and means including a plurality of spaced connecting means welded to said plate and sheet and extending through spaced perforations in said pad for attaching said plate to said one end of said core.

8. A heat insulating structure comprising, a metal core composed of a plurality of interconnected cells; a thin metal plate attached to the upper end of each of said cells; a plurality of discrete spaced apart spacers attached to the upper face of said metal plate; a thin metal sheet attached to the upper ends of said spacers; an impervious closure connected to said metal plate and sheet around the sides and ends thereof to entrap the air in the space between said plate and sheet; a pad attached to said metal sheet and covering the major portion of the top face thereof, said pad being composed of fireproof material having low thermal conductivity; a plurality of spaced apart clips having their lower ends attached to said metal sheet, said clips having portions protruding up through said pad; and a second thin metal sheet attached to the protruding portions of said clips and covering the top surface of said pad.

References Cited in the file of this patent

UNITED STATES PATENTS

| | | |
|---|---|---|
| 1,576,559 | Swift | Mar. 16, 1926 |
| 2,001,632 | Schlicting | May 14, 1935 |
| 2,282,293 | Christenson | May 5, 1942 |
| 2,362,119 | De Stefano | Nov. 7, 1944 |
| 2,752,672 | Tolman | July 3, 1956 |
| 2,778,458 | Briggs | Jan. 22, 1957 |
| 2,900,713 | Young | Aug. 25, 1959 |

OTHER REFERENCES

The Tool Engineer, September 1958, pages 98–101.